United States Patent [19]

Iwamoto

[11] Patent Number: 4,495,828
[45] Date of Patent: Jan. 29, 1985

[54] STROKE ENLARGING MECHANISM

[75] Inventor: Norihiro Iwamoto, Zama, Japan

[73] Assignee: Toshiba Kikai Kabushiki Kaisha, Tokyo, Japan

[21] Appl. No.: 362,543

[22] Filed: Mar. 26, 1982

[30] Foreign Application Priority Data

Mar. 31, 1981 [JP] Japan ................... 56-48200

[51] Int. Cl.³ .................. F16H 19/04; F16H 19/06
[52] U.S. Cl. .......................... 74/110; 74/29; 74/33; 74/37; 74/109
[58] Field of Search ............ 74/110, 37, 27, 29, 74/109, 30, 33

[56] References Cited

U.S. PATENT DOCUMENTS 2,095,043 10/1937 Van Berkel .................. 74/109 X
2,867,058 1/1959 Balsiger ..................... 51/105 SP
3,090,498 5/1963 Palmer ...................... 74/110
3,124,257 3/1964 Price et al. ................. 74/110
3,349,927 10/1967 Blatt ........................ 74/110
3,665,771 5/1972 Blatt ........................ 74/29

FOREIGN PATENT DOCUMENTS 480510 5/1953 Italy ........................ 74/29

Primary Examiner—Allan D. Herrmann
Assistant Examiner—Arthur T. Quiray
Attorney, Agent, or Firm—Koda and Androlia

[57] ABSTRACT

A stroke enlarging mechanism comprises a stationary rack, a saddle member driven by an actuator relative to the stationary rack, an operating arm movable relative to the saddle member, and a movable rack secured to the operating arm. A first pinion and a second pinion are rotatably mounted in the saddle member to be engageable with the stationary rack and the movable rack, respectively. A coupling device couples the two pinions with each other. Upon driving the saddle member relative to the stationary rack, the two pinions are rotated thus displacing the operating arm for a distance larger than the driving stroke of the saddle member.

4 Claims, 5 Drawing Figures

STROKE ENLARGING MECHANISM

BACKGROUND OF THE INVENTION

This invention relates to a stroke enlarging mechanism of an arm and the like, and more particularly to a type thereof adapted to be used in a work removing device for a die-casting machine or a press.

In a technical field of, for instance, industrial robots and manipulators, it is frequently required that a chuck-hand thereof grasps and transports products or works from one position to another along a linear path, and such functions have been accomplished by an arm coupled to a piston operated by a hydraulic or pneumatic cylinder.

In the above described case, although there is no problem when the distance of the required movement of the arm is equal to or less than the stroke of the piston, a mechanism for enlarging or multiplying the stroke of the piston is required when the distance of the required movement is larger than the stroke of the piston.

A typical construction of a conventional stroke enlarging mechanism is shown in FIG. 1. In this mechanism, a pinion 14 is mounted to be freely rotatable at an end of a piston rod 12 movable in a cylinder 10, and a pair of movable racks 16 and 18 are disposed so that the pinion 14 engages with the racks 16 and 18 at an upper end and a lower end thereof, respectively. When the piston-rod 12 moves outwardly from the cylinder 10, the rack 16 is driven upward while the rack 18 is driven downward as viewed in FIG. 1. Although an enlargement of the stroke of the piston can be realized by the above described stroke enlarging mechanism, this mechanism requires a space substantially equal to the enlarged stroke, and therefore it has been difficult to use the mechanism in a narrow space such as a factory of a low ceiling height or where the vertical space therein is limited because of the presence of a hoist or a crane, where the mechanism is disposed vertically, and in a narrow space horizontally where the mechanism is disposed horizontally.

SUMMARY OF THE INVENTION

An object of the present invention is to provide a stroke enlarging mechanism which can be used even at a position where available space in vertical and horizontal directions is restricted.

Another object of the invention is to provide a stroke enlarging mechanism which requires a comparatively narrow space regardless of a large stroke obtained by the mechanism.

Still another object of the invention is to provide a stroke enlarging mechanism which is advantageously applicable to various manipulators and the like.

These and other objects can be achieved by a stroke enlarging mechanism of this invention, comprising a supporting frame, a saddle member supported by the supporting frame to be movable along a guide member, an operating arm supported by the saddle member to be movable along another guide member, an actuator secured to the supporting frame for driving the saddle member relative to the supporting frame, a first rack secured stationarily to the supporting frame, a second rack secured to the operating arm to be movable therewith, a first pinion rotatably mounted on the saddle member to be engageable with the first rack, a second pinion rotatably mounted on the saddle member to be engageable with the second rack, and means for coupling the first pinion with the second pinion for transmitting power therethrough.

The invention will now be described in detail with reference to the accompanying drawings.

BRIEF DESCRIPTION OF THE DRAWINGS

In the accompanying drawings.

DESCRIPTION OF PREFERRED EMBODIMENT

Figure 1:
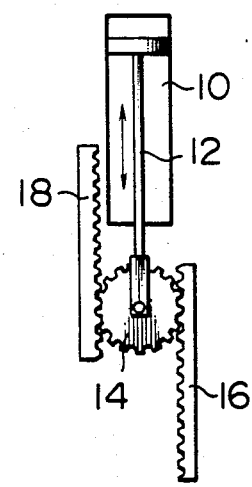
FIG. 1 is a diagram showing a conventional stroke enlarging mechanism.
Figure 2:
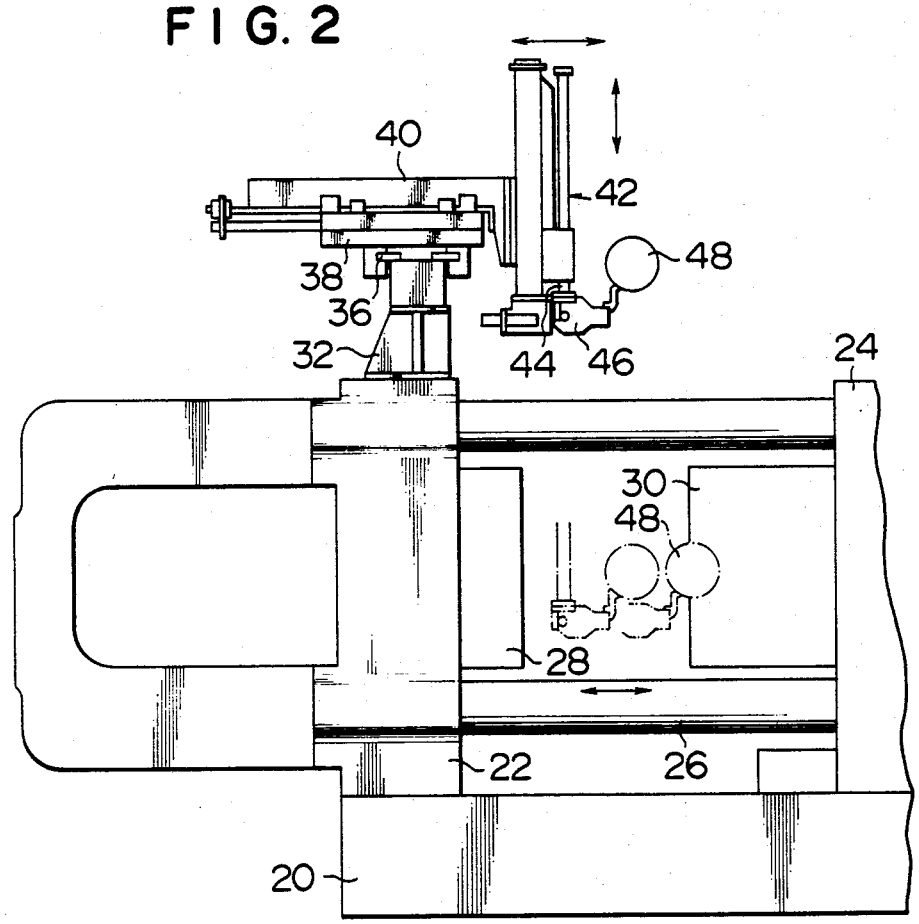
FIG. 2 is a side view showing a die-casting machine having a product removing device to which the present invention is advantageously applied.
Figure 3:
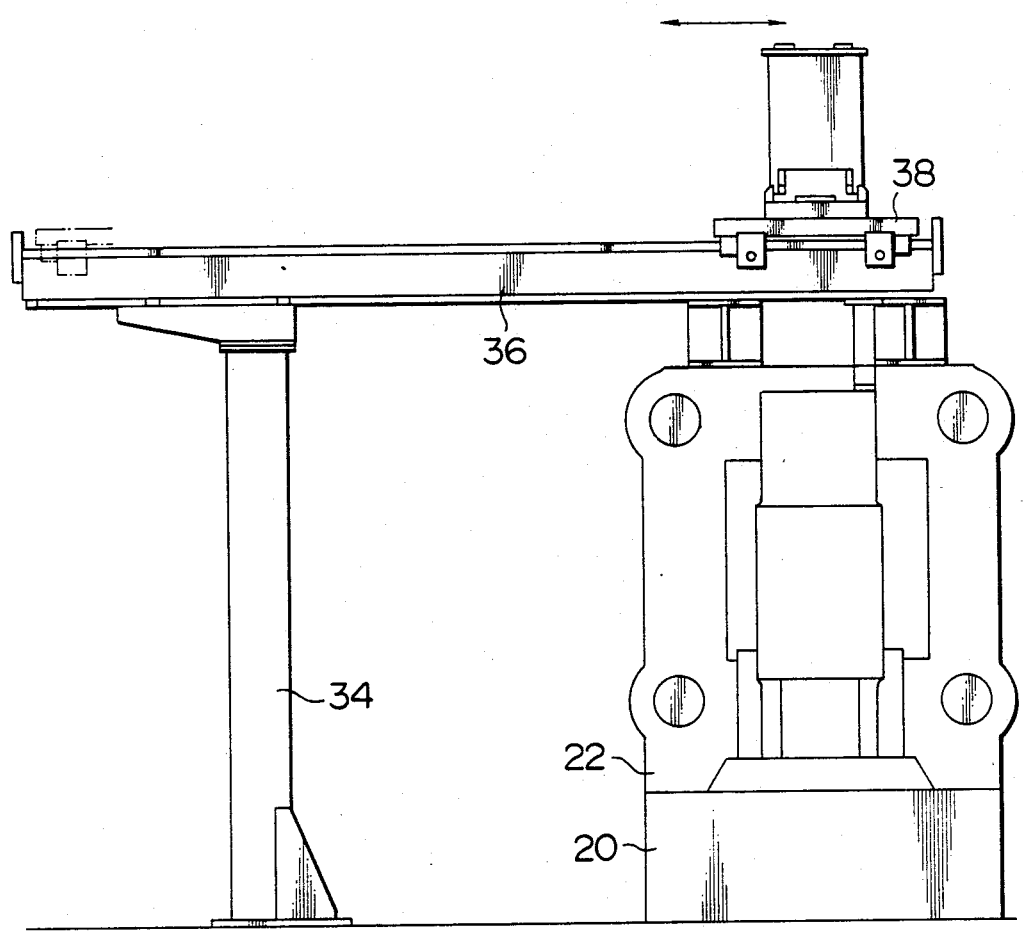
FIG. 3 is another side view of the die-casting machine shown in FIG. 2.

Referring now to FIGS. 2 and 3, there is illustrated a die-casting machine having a product removing device to which is applied a mechanism of the present invention. The die-casting machine comprises a bed 20 supporting a stationary die plate 22, and a movable die plate 24 which is movable along tie bars 26 toward or away from the stationary die plate 22. The die plates 22 and 24 support stationary and movable metal mold halves 28 and 30, respectively. When the movable die plate 24 is driven to a position at which it engages the stationary die plate 22, the stationary and movable mold halves 28 and 30 are combined into a complete metal mold which is adapted for producing a product when molten metal is injected therein.

The stationary die plate 22 is further provided with a rail supporting member 32 secured to the upper end of the die plate 22 for supporting one ends of rails 36 on the upper surface thereof. The other ends of rails 36 are supported by a vertically extending frame 34 provided on one side of the die-casting machine. The rails 36 may preferably be further extended to a position where a subsequent process such as trimming process is carried out.

A member 38 is mounted on the rails 36 to be movable therealong under the action of, for instance, a hydraulic cylinder (not shown), and a slidable member 40 is mounted to be slidable along the member 38 horizontally and perpendicularly to the longitudinal direction of the rails 36 under the action of another hydraulic cylinder for example. A vertical product unloader 42 is secured to an end of the slidable member 40. The unloader 42 includes a downwardly extending arm 44 which has a chuck hand 46 at the lower end thereof for removing a die-cast product 48 out of the metal mold. More specifically, when a die-casting operation terminates and the metal mold is opened, the product unloader 42 is brought to a position just above the metal mold by the forward movement of the slidable member 40. The arm 44 is then driven downwardly to a position where the chuck hand 46 can grasp the product 48. The arm 44 is then driven upward while the slidable member 40 retracts, and the product 48 is transported toward the subsequent process position as the member 38 is driven along the rails 36.

An example of the stroke enlarging mechanism, which is advantageously applied to the product unloader 42, will now be described with reference to FIGS. 4 and 5. The mechanism includes a supporting frame 50 made of a metal plate, two end portions 60 and 62 of which are bent forwardly (leftwardly) as viewed in FIG. 4 at right angles to the middle portion of the metal plate so that a channel shaped cross-sectional configuration is obtained for the supporting frame 50. The middle portion of the supporting frame 50 is secured to an end of the slidable member 40.

A pair of vertical guide rods 52 are provided between the upper end portion 60 and the lower end portion 62 of the supporting frame 50. A saddle member 54 is supported by the supporting frame 50 to be slidable vertically along the two guide rods 52. The saddle member 54 in turn supports a pair of guide arms 56 to be slidable upwardly and downwardly relative to the saddle member 54. The guide arms 56 support a chuck hand 58 provided at the lower end of the guide arms.

Figure 4:
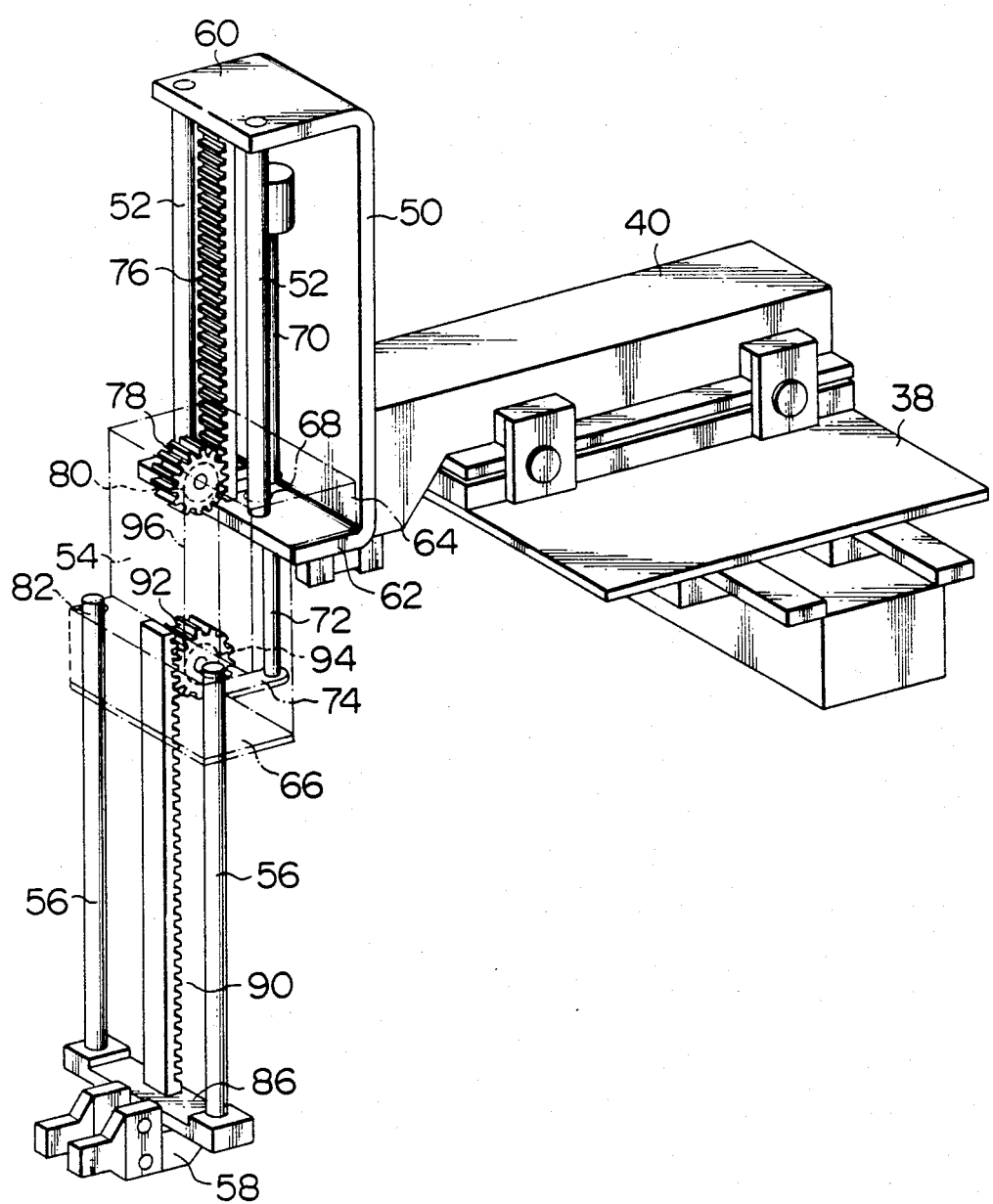
FIG. 4 is a perspective view of a stroke enlarging mechanism according to the present invention applied to the product removing device of the die-casting machine.

More specifically, the saddle member 54 is shaped into a casing-like construction having an upper portion 64 projecting rearwardly (or rightwardly) and a lower portion 66 projecting forwardly (or leftwardly) as viewed in FIG. 4. The guide rods 52 extend through two holes 68 provided through the upper portion 64 projecting rearwardly.

Figure 5:
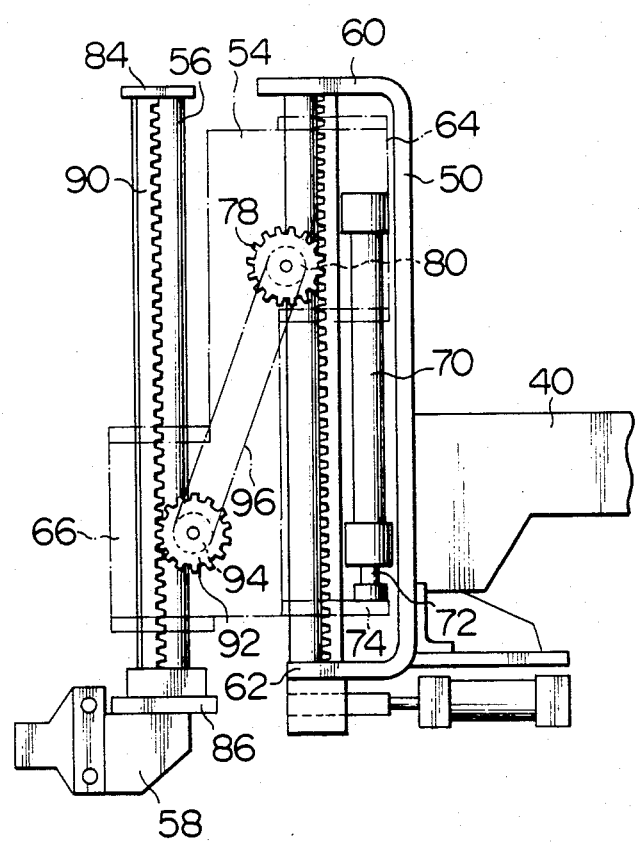
FIG. 5 is a side view showing the stroke enlarging mechanism shown in FIG. 4 in an operating state in which an operating arm is retracted.

As shown in FIG. 5, an actuator in the form of, for instance, a hydraulic cylinder 70 is provided internally of the supporting frame 50. The lower end of a piston rod 72 extending downwardly from the hydraulic cylinder 70 is secured to a projection 74 projecting rearwardly from the lower portion 66 of the saddle member 54. When the hydraulic cylinder 70 is actuated, the piston rod 72 moves downwardly thereby driving the saddle member 54 downwardly as shown in FIG. 4. It should be noted that the lower end portion 62 of the supporting frame 50 is partly cut off to permit lowering of the piston rod 72 and the projection 74.

Internally of the supporting frame 50, there is further provided a vertical stationary rack 76 secured between the upper and lower end portions 60 and 62 of the supporting frame 50. Teeth are formed on the front surface of the rack 76.

A pinion 78 engaging with the teeth of the rack 76 is provided in the casing-like upper portion 64 of the saddle member 54. Preferably a pair of sprocket wheels 80 are mounted on both sides of the pinion 78 so that the pinion 78 and the sprocket wheels 80 are rotated integrally within the upper portion of the saddle member 54.

Thus, when the saddle member 54 is moved downwardly upon actuation of the actuator 70, the pinion 78 engaging with the stationary rack 76 is rotated, thereby rotating the sprocket wheels 80. As will be described hereinlater in detail, the sprocket wheels 80 are respectively coupled with another pair of sprocket wheels through chains 96.

Two holes 82 are also provided through the lower portion 66 of the saddle member 54 for slidably receiving the guide arms 56.

The upper ends of the guide arms 56 are connected together by a planar member 84, while the lower ends of the guide arms 56 are connected together by another planar member 86. A chuck hand 58 is secured to the lower planar member 86. The chuck hand 58 is a kind of a manipulator for grasping and removing the products out of the die-cast machine. Since this type of manipulator is well known in the art, detailed description thereof will be omitted.

At an intermediate position between the two guide arms 56, another rack 90 is extended vertically, the upper and lower ends thereof being secured to the upper and lower planar members 84 and 86. Teeth are provided on the rearside of the rack 90.

A pinion 92 engaging with the rack 90 is provided to be rotatable in the lower portion 66 of the casing-like saddle member 54. Preferably, another pair of sprocket wheels 94 are mounted on both sides of the pinion 92 so that the pinion 92 and the sprocket wheels 94 are integrally rotatable in the saddle member 54. Two chains 96 are extended around the sprocket wheels 94 and 80 for transmitting power between the sprocket wheels. When the sprocket wheels 80 in the upper portion 64 of the saddle member 54 is driven as described hereinbefore, upon actuation of the actuator 70, the rotations of the sprocket wheels 80 are transmitted through the chains 96 to the sprocket wheels 94 in the lower portion 66 of the saddle member 54 thereby rotating the pinion 92. The rotation of the pinion 92 moves the rack 90 upwardly or downwardly together with the guide arms 56 and the chuck hand 58.

The stroke enlarging mechanism according to the present invention operates as follows.

When the actuator 70 is not actuated, the saddle member 54 and the guide arms 56 are positioned at the upper portion as shown in FIG. 5, thus reducing the vertical length of the entire mechanism. When the actuator 70 is actuated, however, the piston rod 72 moves downwardly thereby depressing the horizontal projection 74 of the saddle member 54 as shown in FIG. 4. Lowering of the saddle member 54 rotates counter-clockwisely the pinion 78 engaging with the rack 76 secured to the supporting frame 50, thus rotating the sprocket wheels 80 in the same direction. The rotations of the sprocket wheels 80 are transmitted through chains 96 to the sprocket wheels 94 provided in the lower portion 66 of the saddle member 54, thus rotating the pinion 92 secured to the sprocket wheels 94 in the counter-clockwise direction. The counter-clockwise rotation of the pinion 92 lowers the rack 90 together with the guide arms 56, upper and lower planar members 84 and 86, and the chuck hand 58. In this case, the guide arms 56 and hence the chuck hand 58 are lowered by a distance substantially equal to twice the stroke of the piston rod 72 of the actuator 70, thus enlarging the stroke.

Since the stroke enlarging mechanism of this invention is simple in construction, and requires much smaller space and height than those of the conventional device, the mechanism can be used advantageously in a factory or the like wherein the space is restricted vertically and horizontally.

Although the stroke enlarging mechanism of this invention has been described with respect to an application to a product unloader of a die-casting machine, it is apparent that the invention may also be applied to various manipulators and the like where the stroke of an arm is required to be enlarged more than that of the actuator.

What is claimed is:
1. A stroke enlarging mechanism comprising:
a stationary supporting frame having a predetermined length L;

a stationary guide member secured to said supporting frame so as to extend along the length of said supporting frame;

a saddle member movable along said guide member;

an operating arm supported by said saddle member to be movable along the length of said supporting frame;

an actuator secured to said supporting frame for driving said saddle member along said guide member;

a first rack secured to said supporting frame and extending along its length;

a second rack secured to said operating arm to be movable therewith along the length of the supporting frame;

said stationary guide member, said saddle member, said actuator, said operating arm and said first and second racks having lengths substantially equal to the length L of said supporting frame and disposed at positions substantially included within the length L of said frame;

a first pinion rotatably mounted on said saddle member at a first position thereof to be engageable with said first rack;

a second pinion rotatably mounted on said saddle member at a second position thereof, which is spaced apart from said first position by a predetermined distance D along the length of said supporting frame, so that said second pinion is engageable with said second rack; and means for coupling said first pinion with said second pinion for transmitting power therebetween, so that not only a predetermined ratio of stroke enlargement can be obtained, but also the length of the entire mechanism in an inoperative state can be minimized to substantially be equal to L.

2. A stroke enlarging mechanism as set forth in claim 1 wherein said coupling means comprises sprocket wheels secured to said first pinion and said second pinion, respectively, and a chain extended around said sprocket wheels.

3. A stroke enlarging mechanism as set forth in claim 1 wherein said actuator is a hydraulic cylinder.

4. A stroke enlarging mechanism as set forth in claim 1 wherein said saddle member is shaped into a casing-like construction encasing the first pinion and the second pinion in said spaced apart relation along the length of said supporting frame.

* * * * *